United States Patent
Ito et al.

(10) Patent No.: US 8,107,190 B2
(45) Date of Patent: Jan. 31, 2012

(54) FLUID BEARING DEVICE, METHOD OF MANUFACTURING THE SAME, AND DISK DRIVE DEVICE

(75) Inventors: Kenji Ito, Kuwana (JP); Fuyuki Ito, Kuwana (JP)

(73) Assignee: NTN Corporation, Osaka-shi (JP)

( * ) Notice: Subject to any disclaimer, the term of this patent is extended or adjusted under 35 U.S.C. 154(b) by 929 days.

(21) Appl. No.: 12/066,597

(22) PCT Filed: Sep. 11, 2006

(86) PCT No.: PCT/JP2006/317961
§ 371 (c)(1),
(2), (4) Date: Mar. 12, 2008

(87) PCT Pub. No.: WO2007/032299
PCT Pub. Date: Mar. 22, 2007

(65) Prior Publication Data
US 2009/0284866 A1 Nov. 19, 2009

(30) Foreign Application Priority Data

Sep. 14, 2005 (JP) ................................ 2005-267144
Oct. 6, 2005 (JP) ................................ 2005-293882
Oct. 6, 2005 (JP) ................................ 2005-293890

(51) Int. Cl.
*G11B 17/02* (2006.01)
*H02K 15/12* (2006.01)
*F16C 33/00* (2006.01)

(52) U.S. Cl. .................. 360/99.08; 384/114; 264/272.2; 264/328.1; 29/898.02

(58) Field of Classification Search .................. 384/100, 384/107, 112, 114, 120, 121, 123; 264/161, 264/162, 239, 272.2, 328.1, 328.12; 29/898.02; 360/99.08
See application file for complete search history.

(56) References Cited

U.S. PATENT DOCUMENTS

| 7,556,433 | B2 * | 7/2009 | Kurimura et al. | 384/107 |
| 2007/0273986 | A1 * | 11/2007 | Kajita | 359/811 |
| 2008/0011551 | A1 * | 1/2008 | Inazuka et al. | 184/54 |

FOREIGN PATENT DOCUMENTS

JP 58-69029 A 4/1983
(Continued)

OTHER PUBLICATIONS

International Search Report of PCT/JP2006/317961, date of mailing Nov. 7, 2006.

*Primary Examiner* — Will J Klimowicz
(74) *Attorney, Agent, or Firm* — Westerman, Hattori, Daniels & Adrian, LLP (57) ABSTRACT

Provided is a fluid bearing device with a hub part having high molding precision and dimensional stability and capable of being produced at low cost. An annular gate (14) is formed at a portion of a cavity (15) corresponding to an outer peripheral edge portion of a lower end surface (10c1) of a flange part (10c), and a molten resin (P) is filled into the cavity (15) through the annular gate (14) to form a hub part (10) made of resin. The hub part (10) molded by the injection molding exhibits a radial resin orientation through an entire periphery thereof. Further, an annular gate trace (16) is formed at the outer peripheral edge portion of the lower end surface (10c1) of the flange part (10c) of the hub part (10).

1 Claim, 7 Drawing Sheets

FOREIGN PATENT DOCUMENTS

| | | |
|---|---|---|
| JP | 63-236612 A | 10/1988 |
| JP | 5-070155 U | 9/1993 |
| JP | 7-312015 A | 11/1995 |
| JP | 2001-319443 A | 11/2001 |
| JP | 3292804 B2 | 6/2002 |
| JP | 2005061557 A * | 3/2005 |

* cited by examiner

FLUID BEARING DEVICE, METHOD OF MANUFACTURING THE SAME, AND DISK DRIVE DEVICE

TECHNICAL FIELD

The present invention relates to a fluid bearing device supporting a shaft member so as to allow the shaft member to make radial relative rotation by means of a fluid lubricant film generated in a radial bearing gap, a method of manufacturing the same, and a disk drive device equipped with the fluid bearing device. Examples of a disk drive device include a magnetic disk drive device such as an HDD, an optical disk drive device for a CD-ROM, CD-R/RW, DVD-ROM/RAM, etc., and a magneto-optical disk drive device for an MD, MO, etc. Further, the fluid bearing device of the present invention is suitably applicable to a small motor for an information apparatus other than a disk drive device, such as a polygon scanner motor of a laser beam printer (LBP), a collar wheel motor of a projector, or a fan motor.

BACKGROUND ART

Apart from high rotational accuracy, an improvement in speed, a reduction in cost, a reduction in noise, etc. are required of the motors mentioned above. One of the factors determining such requisite performances is the bearing supporting the spindle of the motor. Recently, use of a fluid bearing superior in the above requisite performances has been considered, or such a fluid bearing has been actually put into practical use.

This type of fluid bearing is roughly classified into two categories: a dynamic pressure bearing equipped with a dynamic pressure generating portion for generating dynamic pressure in a lubricant in a bearing gap, and a circular bearing equipped with no such dynamic pressure generating portion (bearing whose bearing surface is of a circular configuration).

For example, in a fluid bearing device incorporated into a spindle motor for a disk drive device such as an HDD, both a radial bearing portion radially supporting a shaft member and a thrust bearing portion supporting it in a thrust direction may be formed of dynamic pressure bearings. As a radial bearing portion in a fluid bearing device (dynamic pressure bearing device) of this type, there is known, for example, a radial bearing portion in which a dynamic pressure groove as a dynamic pressure generating portion is formed in one of the inner peripheral surface of a bearing sleeve and the outer peripheral surface of a shaft member opposed thereto, with a radial bearing gap being formed between those two surfaces (see, for example, Patent Document 1).

When the above-mentioned fluid bearing device is incorporated into a motor for a disk drive device such as an HDD, a hub is provided on the shaft member, and an information storage medium such as a magnetic disk is placed or retained on an end surface of this hub (e.g., see, Patent Document 2). To the portion of the disk hub opposed to a stator coil provided on the stationary side of the motor, there is usually fixed a yoke formed of a magnetic material for improving the magnetic force efficiency between the rotor magnet and the stator coil. As a means for fixing a yoke of this type to the disk hub, there is known, for example, a means using an adhesive.
[Patent Document 1] JP 2003-239951 A
[Patent Document 2] JP 2005-45924 A

DISCLOSURE OF THE INVENTION

Problems to be Solved by the Invention

Recently, in view of demands for a reduction in the price of information apparatuses, a number of proposals have been made for a reduction in the production cost of a fluid bearing device as described above. For example, to achieve a reduction in material cost, formation of a component of the fluid bearing device, such as the hub made of resin, is being considered.

However, when molding the hub, depending upon, for example, the setting of the configuration and position of a gate for filling the cavity with molten resin, the molding precision for the hub may deteriorate, so there is a fear of the requisite physical properties of the hub as mentioned below not being attained.

Figure 12:
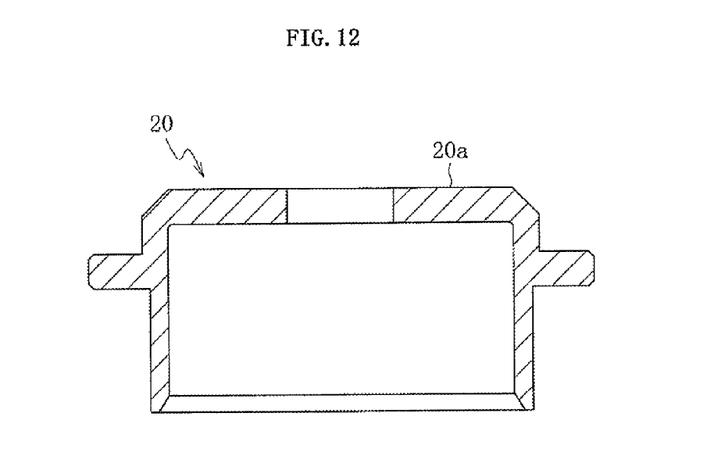
FIG. 12 A sectional view of a form of hub part.
Figure 13:
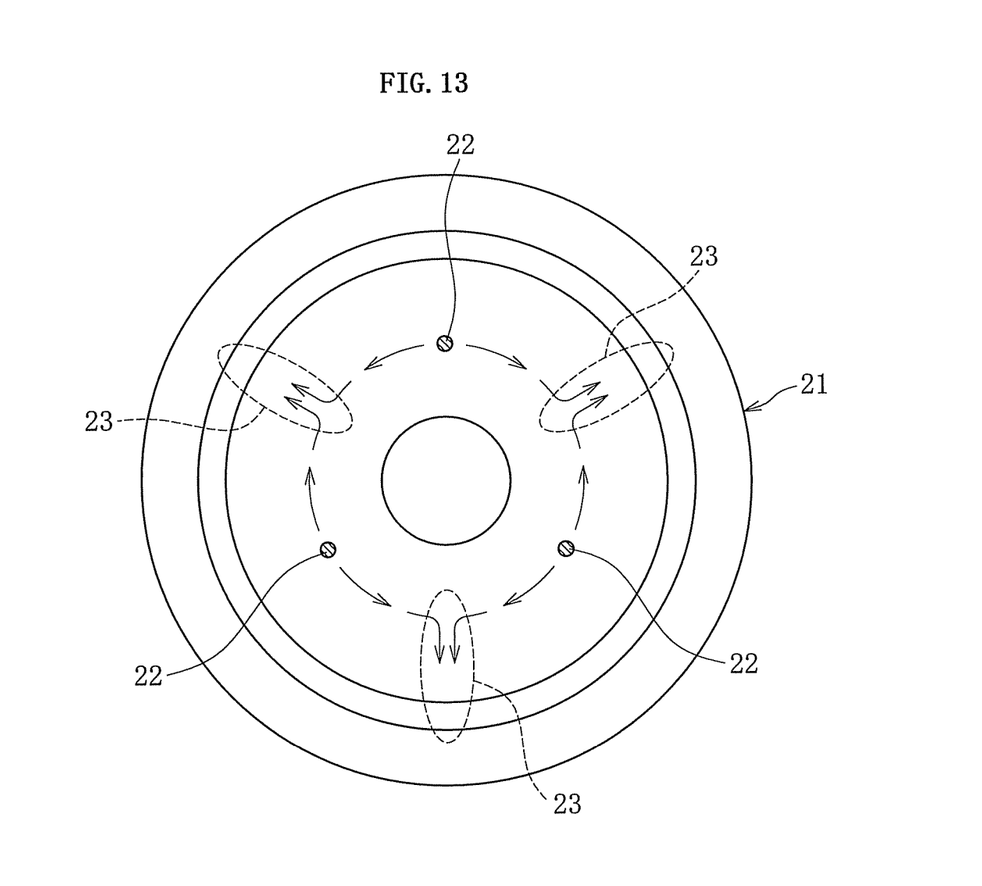
FIG. 13 A conceptual drawing illustrating how molten resin flows in a cavity when dot-like gates are used.
Figure 14:
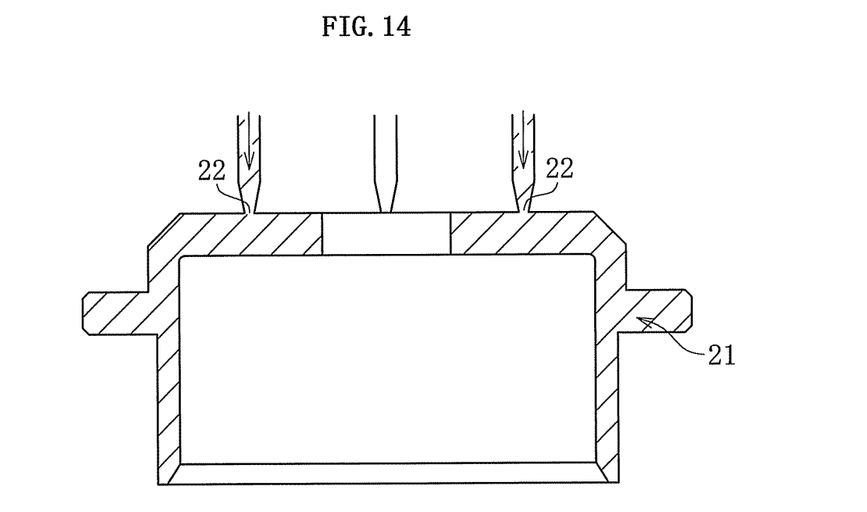
FIG. 14 A conceptual drawing illustrating a hub part injection molding process using dot-like gates.

For example, when forming a hub 20 of a configuration as shown in FIG. 12 by resin injection molding, a method may be adopted in which, as shown in FIGS. 13 and 14, a plurality of dot-like gates 22 (three dot-like gates provided at equal circumferential intervals in the example shown) are provided in a mold (not shown) having a cavity 21 at positions corresponding to one end surface 20a of the hub 20, and the cavity 21 is filled with molten resin P supplied through the plurality of dot-like gates 22. However, in this method, portions of the molten resin P sent into the cavity 21 from the dot-like gates 22 flow circumferentially from the dot-like gates 22 (in the directions indicated by the arrows in FIG. 13) to join at intermediate positions 23 between the dot-like gates 22. Thus, at the intermediate positions 23, the flowing directions of the portions of the molten resin P thus joined from the opposite circumferential directions are changed from the circumferential to radial directions. As a result, in the cured resin molding (hub 20), the resin orientation (molecular orientation) at the intermediate positions 23 differs from that at the other circumferential positions.

This may lead to variation in molding shrinkage amount in the circumferential direction; for example, there is a fear of the geometrical precision of the surface requiring high dimensional precision, such as the disk mounting surface, being deteriorated. Further, during use of the fluid bearing device equipped with this hub, the amount by which the hub dimension changes with changes in temperature varies in the circumferential direction, so the fixation accuracy (angularity, coaxiality, or the like) of the hub with respect to the shaft member deteriorates, which may adversely affect the rotation accuracy.

After the molten resin in the cavity has been cooled and cured, the mold is opened to extract the molding therefrom. In the state prior to the opening of the mold, the molding is connected to cured gate portions; by opening the mold, the cured gate portions are severed and a part of the cured gate portions remains on the molding side as gate traces. Thus, depending upon the size and configuration of the gate traces (cured gate portions) remaining on the molding side, cutting or the like is performed on the molding to remove the cured gate portions from the molding.

On the cured gate portions constituting the gate traces and the gate removal traces remaining on the molding after the removal of the cured gate portions, there exist severed surfaces formed at the time of gate cutting and removal machined surfaces formed at the time of removal. Unlike the molding surface, such severed surfaces and removal machined surfaces exhibit exposed inner sections of the resin molding, so, for example, a filler mixed with the resin material is partially allowed to be exposed, and the filler or the like is likely to be detached from those surfaces. Any detached filler or the like will adhere to the surface of the housing or the like, and may be mixed into the lubricant filling the interior of the bearing device at the time of assembly of the bearing device as contaminant. In particular, contaminant generated around the disk hub may adhere to the disk surface to reduce the reading precision for the disk, which is undesirable.

In a disk drive device such as an HDD, to attain high disk reading precision, the dimensional precision of the hub retaining the disk, more precisely, the dimensional precision of the disk mounting surface on which the disk is placed, constitutes an important factor. If it is simply required to achieve higher precision of the disk mounting surface, high precision machining is to be separately performed on the disk mounting surface, which leads to high machining cost.

It is an object of the present invention to provide a fluid bearing device which allows production of a hub with high molding precision and dimensional stability at low cost and a method of manufacturing the same.

Another object of the present invention is to provide a fluid bearing device which can be produced at low cost and which is of high cleanliness.

Means for Solving the Problems

In order to solve the above-mentioned problems, the present invention provides a fluid bearing device including: a shaft member; a hub part provided integrally with or separately from the shaft member; and a radial bearing portion which radially supports the shaft member so as to allow relative rotation by means of a lubricant film of a fluid generated in a radial bearing gap that an outer peripheral surface of the shaft member faces, in which the hub part is formed of resin, and exhibits a radial resin orientation over an entire periphery.

In this way, in a hub part which exhibits a radial resin orientation at any circumferential position, there is no circumferential variation in the shrinkage direction at the time of molding, so the molding shrinkage can be made as uniform as possible. Further, the circumferential variation in the dimensional change amount due to temperature changes can be restrained as much as possible. Thus, the requisite dimensional precision (such as flatness) for the hub part and high fixation accuracy (angularity) for the shaft member are secured, making it possible to provide a fluid bearing device having high rotational precision.

Further, in order to solve the above-mentioned problems, the present invention provides a fluid bearing device including: a shaft member; a hub part provided integrally with or separately from the shaft member; and a radial bearing portion which radially supports the shaft member so as to allow relative rotation by means of a lubricant film of a fluid generated in a radial bearing gap that an outer peripheral surface of the shaft member faces, in which the hub part is formed by injection molding of resin, and in which an annular gate trace is formed on the hub part as a result of the injection molding. Here, the term "gate trace" means a portion allowing discrimination of the gate position from the molding when filling the mold with molten resin at the time of injection molding of the bearing member; for example, of the resin cured in the gate at the time of injection molding, the portion remaining on the surface of the molding after the gate cutting is included. Alternatively, a gate removal trace formed at the time of removal of the remaining portion by machining or the like is included.

Further, in order to solve the above-mentioned problems, the present invention provides a method of manufacturing a fluid bearing device including: a shaft member; a hub part provided integrally with or separately from the shaft member; and a radial bearing portion which radially supports the shaft member so as to allow relative rotation by means of a lubricant film of a fluid generated in a radial bearing gap that an outer peripheral surface of the shaft member faces, the method including an injection molding step of forming the hub part through injection molding of resin, in which, in the injection molding step, a mold for the hub part is provided with an annular gate, from which molten resin is supplied to fill a cavity.

At the time of injection molding, the cavity is filled with molten resin supplied from the entire periphery via the annular gate, so the cured molding (hub part) exhibits a substantially uniform radial resin orientation when seen at least in the circumferential direction, whereby it is possible to effect radial molding shrinkage of the hub part as uniformly as possible.

When incorporating the above-mentioned fluid bearing device into a disk drive device such as an HDD, the disk mounting surface is formed on the hub part; in this case, it is desirable for the gate trace to be formed in the vicinity of the gate mounting surface. In this construction, at the time of injection molding, the filling with molten resin is effected, with the gate being arranged in the vicinity of the disk mounting surface, so it is possible to fill the region of the cavity corresponding to the disk mounting surface while maintaining high injection pressure. Thus, it is possible to reduce the molding shrinkage amount at the corresponding portion, thereby enhancing the dimensional precision.

In the hub part injection molding process according to the present invention, it is desirable for the injection molding to be performed by using an annular gate whose gate width varies in the circumferential direction. Usually, in injection molding of this type, a sprue and a runner are provided between the nozzle of the injection apparatus for injecting molten resin and the gate provided in the cavity of the mold, and the molten resin injected from the nozzle reaches the gate by way of the sprue and runner, which undergo branching. Thus, actually, even in the case in which an annular gate is provided, the molten resin is not sent into the cavity simultaneously from the entire periphery but there is sometimes involved a time lag. The present invention has been made in view of this; for example, of the annular gate, the gate width of the portion at a large distance (molten-resin flow path length) from the injection nozzle is made large, and the gate width of the portion on the opposite side (side nearer to the injection nozzle) is made small, whereby it is possible to solve the problem due to the above-mentioned time lag. Thus, the radial resin flow within the cavity is made uniform over the entire periphery, making it possible to obtain a molding (hub part) exhibiting a more uniform resin orientation.

Further, in order to solve the above-mentioned problems, the present invention provides a fluid bearing device including: a shaft member; a hub part provided integrally with or separately from the shaft member; a radial bearing portion which radially supports the shaft member so as to allow relative rotation by means of a lubricant film of a fluid generated in a radial bearing gap that an outer peripheral surface of the shaft member faces; and a yoke formed of a magnetic material and bonded to the hub part, in which the hub part is formed by injection molding of resin, and in which a gate trace formed on the hub part by the injection molding is stopped by adhesive supplied to bonding fixation surfaces of the hub part and the yoke.

Further, in order to solve the above-mentioned problems, the present invention provides a method of manufacturing a fluid bearing device including: a shaft member; a hub part provided integrally with or separately from the shaft member; a radial bearing portion which radially supports the shaft member so as to allow relative rotation by means of a lubricant film of a fluid generated in a radial bearing gap that an outer peripheral surface of the shaft member faces; and a yoke formed of a magnetic material and bonded to the hub part, the method including: an injection molding step of forming the hub part by injection molding of resin; and a bonding fixation step of bonding the yoke to the hub part formed in the injection molding step, in which, in the bonding fixation step, a gate trace formed by injection molding of the hub part is stopped with an adhesive supplied to bonding fixation surfaces of the hub part and the yoke, with the adhesive being cured while stopping the gate trace.

In this way, the gate trace formed on the surface of the hub part through injection molding of resin is stopped with the adhesive supplied to the interface between the bonding fixation surfaces of the hub part and the yoke, whereby, after the bonding fixation of the hub part and the yoke, the gate trace is sealed to the external space (outside air). Thus, a filler or the like is prevented from being detached from the gate trace (cured gate portion and gate removal trace) and falling to adhere to the interior of the bearing device or the periphery thereof, making it possible to enhance the cleanliness of the bearing device and the periphery thereof.

In this construction, when the hub part and the yoke are bonded and fixed to each other, the gate trace is stopped. Thus, the gate trace can be stopped solely by the yoke, which is a component of the fluid bearing device, and the adhesive for bonding fixation of the yoke, and there is no need to provide a separate process for stopping the gate trace in addition to the hub part injection molding process and the bonding fixation process. Thus, the stopping operation can be conducted without involving an increase in cost.

It is more desirable for the gate trace to be on the surface to which the yoke is bonded and fixed. With this construction, the gate trace is reliably sealed by the adhesive supplied to the interface between the bonding fixation surfaces of the yoke and the hub part, so it is possible to more reliably prevent generation of contaminant at the gate trace.

Further, in order to solve the above-mentioned problems, the present invention provides a disk drive device including: a fluid bearing device including a shaft portion, a rotary member having a hub part provided integrally with or separately from the shaft portion, and a radial bearing portion which radially supports the rotary member so as to allow rotation in a non-contact fashion by a dynamic pressure action of a fluid generated in a radial bearing gap that an outer peripheral surface of the shaft portion faces; a disk held in contact with a disk mounting surface of the hub part and fixed in position by a predetermined clamping force; and a motor portion for rotating the rotary member with the disk mounted thereon, in which a disk mounting surface on which the disk is mounted is deformed so as to be in conformity with a contact surface of the disk by the clamping force.

In this construction, at the time of fixation of the disk, the disk mounting surface of the hub part is corrected by the contact surface of the disk. Thus, by using a disk with a contact surface finished with high precision, it is possible to enhance the dimensional precision of the disk mounting surface up to the level of the dimensional precision of the disk without having to perform any special high precision machining. In particular, in a magnetic disk for an HDD or the like, the end surface thereof is usually finished with high precision so as to enhance the accuracy with which reading is performed by a disk head, so, by using a disk of this type, it is possible to enhance the dimensional precision of the disk mounting surface easily and at low cost. Thus, it is possible to fix the disk to the hub part while maintaining high angularity with respect to the shaft portion (rotation shaft), whereby it is possible to achieve an improvement in terms of the run-out precision of the disk during rotation.

In this case, it is desirable for the region including the disk mounting surface to be formed by resin molding. Generally speaking, resin exhibits lower rigidity as compared with other materials (metal, ceramics, etc.), so, although it depends upon the thickness in the clamping direction, the disk mounting surface can be easily deformed so as to be in conformity with the contact surface of the disk. Thus, by performing the molding with the emphasis on moldability (cycle time, etc.) rather than the dimensional precision at the time of molding, it is possible to obtain a disk mounting surface in which a high level of compatibility is attained between dimensional precision and machining cost.

EFFECTS OF THE INVENTION

As described above, according to the present invention, it is possible to provide a fluid bearing device allowing production of a hub of high molding precision and dimensional stability at low cost and a method of manufacturing the same.

Further, according to the present invention, it is possible to provide a fluid bearing device allowing production at low cost and of high cleanliness.

Further, according to the present invention, it is possible to provide at low cost a disk drive device equipped with a hub part of high dimensional precision.

BEST MODE FOR CARRYING OUT THE INVENTION

In the following, an embodiment of the present invention will be described with reference to the drawings.

Figure 1:
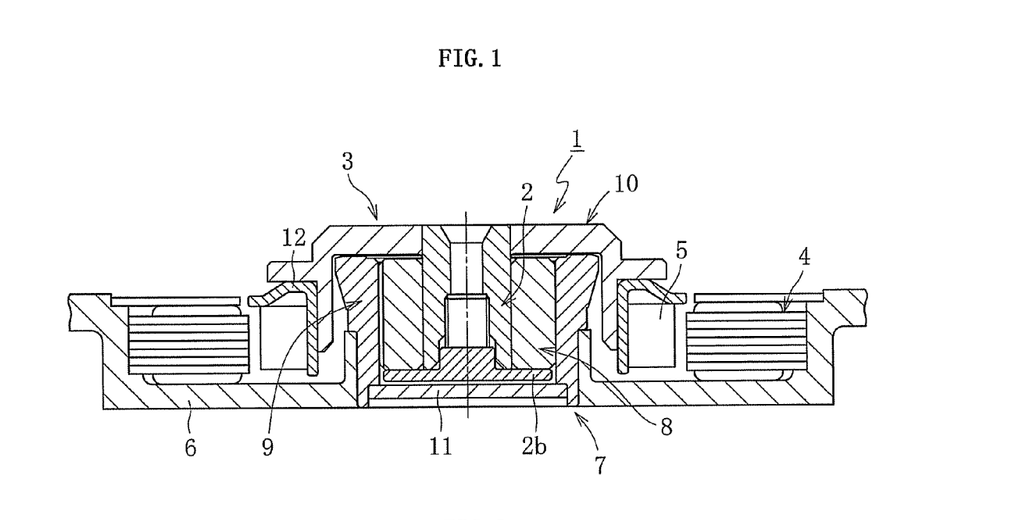
FIG. 1 A sectional view of a spindle motor with a fluid bearing device according to an embodiment of the present invention incorporated therein.

FIG. 1 conceptually illustrates a construction example of an information apparatus spindle motor with a fluid bearing device 1 according to an embodiment of the present invention incorporated therein. This spindle motor is used in a disk drive device such as an HDD, and is equipped with the fluid bearing device (dynamic pressure bearing device) 1 supporting a rotary member 3 having a shaft member 2 and a hub part 10 in a non-contact fashion and so as to allow relative rotation, a stator coil 4 and a rotor magnet 5 that are opposed to each other through the inter mediation, for example, of a radial gap, and a bracket 6. The stator coil 4 is mounted to the bracket 6, and the rotor magnet 5 is fixed to the hub part 10 through the inter mediation of a yoke 12. A bearing member 7 of the fluid bearing device 1 is fixed to the inner periphery of the bracket 6. Further, although not shown, one or a plurality of disks as information recording media are retained by the hub part 10. In this spindle motor, constructed as described above, when electricity is supplied to the stator coil 4, the rotor magnet 5 is rotated by an excitation force generated between the stator coil 4 and the rotor magnet 5, and, with this rotation, the hub part 10 and the disk retained by the hub part 10 rotate integrally with the shaft member 2.

Figure 2:
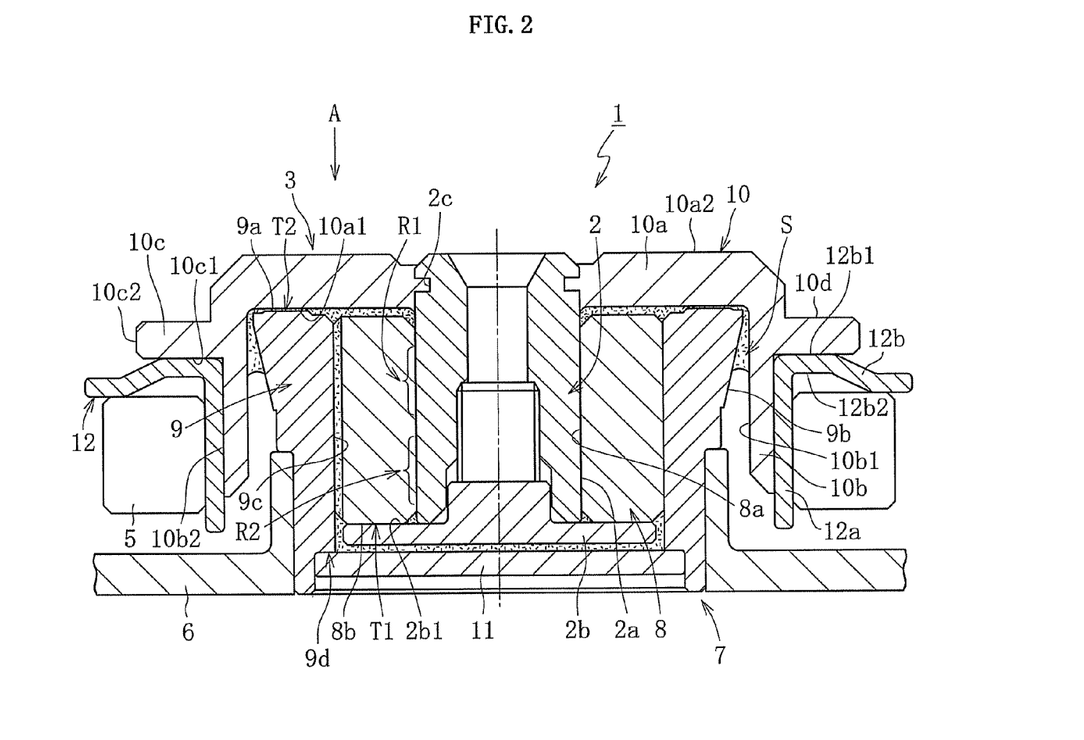
FIG. 2 A sectional view of the fluid bearing device.

FIG. 2 shows the fluid bearing device 1. The fluid bearing device 1 is mainly equipped with the bearing member 7, a cover member 11 closing one end of the bearing member 7, and the rotary member 3 capable of relative rotation with respect to the bearing member 7 and the cover member 11. For the sake of convenience in illustration, in the following description, of the openings formed at both axial ends of the bearing member 7, the one closed by the cover member 11 will be referred to as the lower opening, and the one on the opposite side will be referred to as the upper opening.

The bearing member 7 is formed so as to be open at both axial ends, and is equipped with a substantially cylindrical sleeve portion 8, and a housing portion 9 situated on the outer side of the sleeve portion 8 and formed integrally with or separately from the sleeve portion 8.

The sleeve portion 8 is formed in a cylindrical configuration of, for example, a non-porous metal material or a porous material of a sintered metal. In this embodiment, the sleeve portion 8 is formed in a cylindrical configuration of a porous material of a sintered metal whose main component is copper, and is fixed to an inner peripheral surface 9c of the housing portion 9 by an appropriate means such as bonding (inclusive of loose bonding), press-fit (inclusive of press-fit bonding), or fusion-bonding (inclusive of ultrasonic fusion-bonding). Of course, it is also possible for the sleeve portion 8 to be formed of a material other than metal, such as resin or ceramic.

Figure 3:
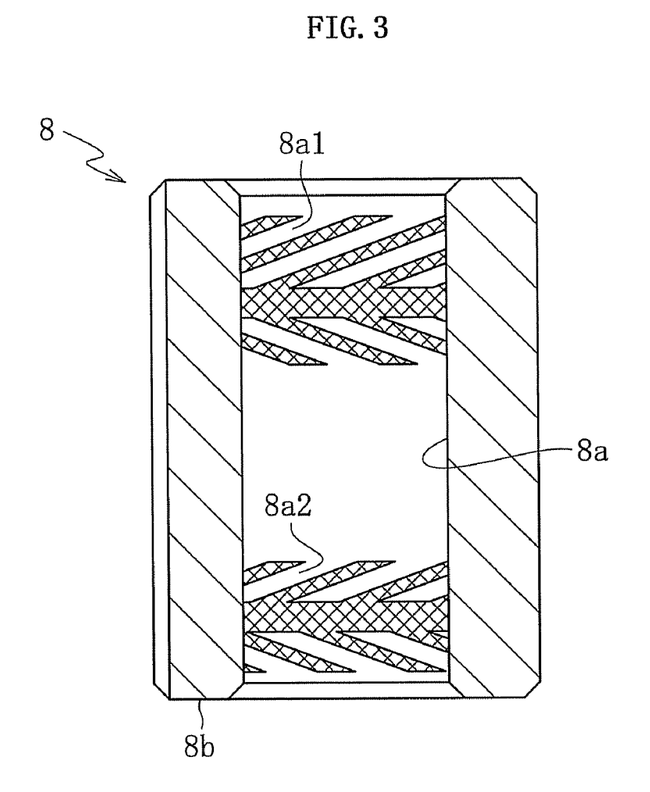
FIG. 3 A longitudinal sectional view of a sleeve portion.

Over all or a part of an inner peripheral surface 8a of the sleeve portion 8, there is formed a region where a plurality of dynamic pressure grooves are arranged as radial dynamic pressure generating portions. As shown, for example, in FIG. 3, in this embodiment, two regions where a plurality of dynamic pressure grooves 8a1 and 8a2 are arranged in a herringbone-like fashion are formed so as to be axially spaced apart from each other.

Figure 4:
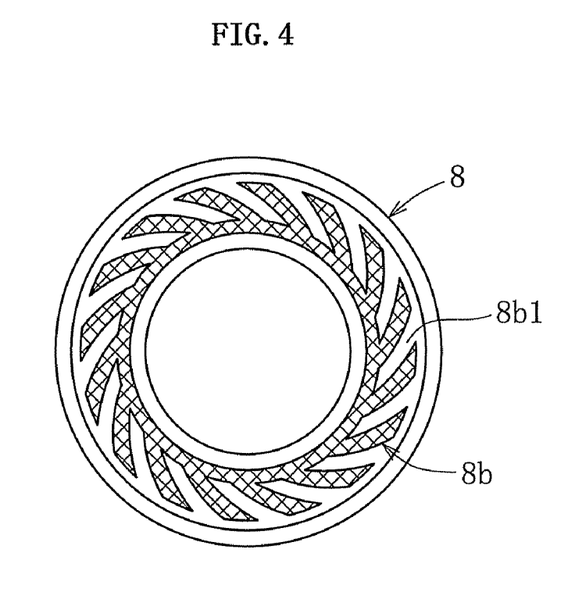
FIG. 4 A lower end view of the sleeve portion.

As shown, for example, in FIG. 4, in all or a part of an annular region of a lower end surface 8b of the sleeve portion 8, there is formed a region where a plurality of dynamic pressure grooves 8b1 are arranged in a spiral fashion.

Figure 5:
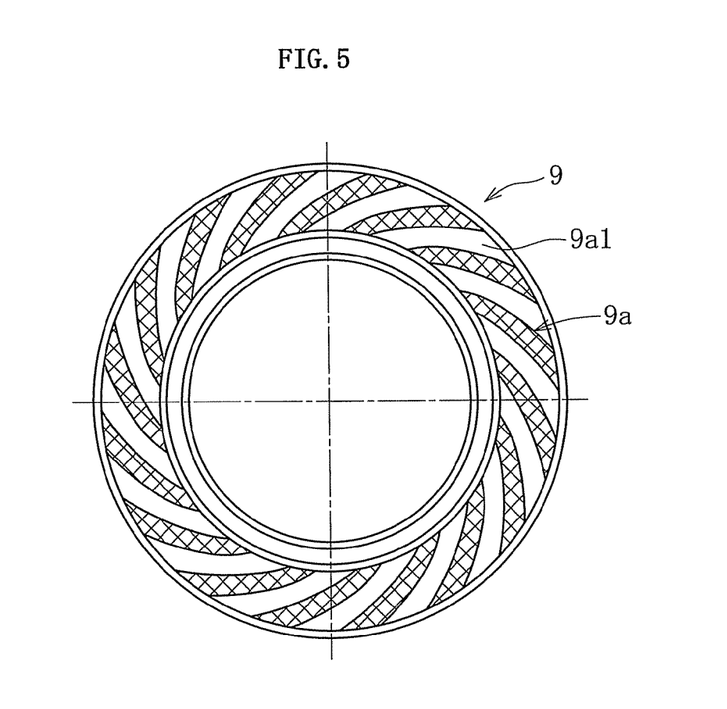
FIG. 5 An end view of a housing portion as seen from the direction of an arrow A.

The housing portion 9 is formed in a substantially cylindrical configuration of metal or resin. In this embodiment, the housing portion 9 is open at both its axial ends, and one end thereof is sealed by the cover member 11. As shown, for example, in FIG. 5, in all or a part of an annular region of the end surface (upper end surface) 9a at the other end, there is formed a region where a plurality of dynamic pressure generating grooves 9a1 are arranged in a spiral fashion as thrust dynamic pressure generating portion. In the outer periphery of the upper portion of the housing portion 9 (outer periphery of upper end surface 9a side end), there is formed an annular tapered surface 9b gradually diverging upwards.

The cover member 11 sealing the lower end of the housing portion 9 is formed of metal or resin, and is fixed to a step portion 9d provided in the inner periphery of the lower end of the housing portion 9. Here, there are no particular limitations regarding the fixing means; according to the material combination, the requisite fixation strength, sealing property, etc., it is possible to appropriately select a means such as bonding (inclusive of loose bonding or press-fit bonding), press-fit, fusion bonding (e.g., ultrasonic fusion-bonding), or welding (e.g., laser welding).

In this embodiment, the rotary member 3 is mainly equipped with the shaft member 2 inserted into the inner periphery of the sleeve portion 8, and the hub part 10 provided at the upper end of the shaft member 2 and arranged at the opening side of the bearing member 7.

In this embodiment, the shaft member 2 is formed of metal, and is formed separately from the hub part 10. In the state in which the shaft member 2 has been inserted into the inner periphery of the sleeve portion 8, an outer peripheral surface 2a of the shaft member 2 is opposed to the dynamic pressure grooves 8a1 and 8a2 formed in the inner peripheral surface 8a of the sleeve portion 8. Then, during rotation of the shaft member 2, the outer peripheral surface 2a forms first and second radial bearing portions R1 and R2 described below between itself and the regions where the dynamic pressure grooves 8a1 and 8a2 are formed (see FIG. 2).

At the lower end of the shaft member 2, a flange part 2b is provided separately as a detachment prevention means. The flange part 2b is formed of metal, and is fixed to the shaft member 2 by a means such as screw fixation. An upper end surface 2b1 of the flange part 2b is opposed to the dynamic pressure groove 8b1 formation region formed in the lower end surface 8b of the sleeve portion 8, and, during rotation of the shaft member 2, forms a thrust bearing gap for a first thrust bearing portion T1 between itself and the dynamic pressure groove 8b1 formation region (see FIG. 2). Further, a recess (which is an annular groove in this embodiment) 2c is formed at the upper end of the shaft member 2. As described below, when forming the hub part 10 through resin injection molding using the shaft member 2 as the insert component, the recess 2c functions as a detachment prevention means for the shaft member 2 with respect to the hub part 10.

The hub part 10 is equipped with a disc part 10a covering the open side (upper side) of the bearing member 7, a cylindrical portion 10b extending axially downwards from the outer peripheral portion of the disc part 10a, a flange part 10c protruding outwardly from the cylindrical portion 10b, and a disk mounting surface 10d formed at the upper end of the flange part 10c. A disk (not shown) is fitted onto the outer periphery of the disc part 10a, and is placed on the disk mounting surface 10d. And, the disk is retained on the hub part 10 by an appropriate means (not shown) (e.g., a clamper).

A lower end surface 10a1 of the disc part 10a is opposed to the upper end surface 9a (dynamic pressure groove 9a1 formation region) provided at one open end of the housing portion 9, and, during rotation of the shaft member 2, forms a thrust bearing gap for a second thrust bearing portion T2 described below between itself and the dynamic pressure groove 9a1 formation region (see FIG. 2).

An inner peripheral surface 10b1 of the cylindrical portion 10b is opposed to the tapered surface 9b provided at the upper end of the outer periphery of the housing portion 9, and forms between itself and the tapered surface 9b a tapered seal space S whose diameter is gradually reduced upwards. In the state in which the interior of the fluid bearing device 1 is filled with lubricant as described below, the oil level of the lubricant is constantly within the range of the seal space S.

The hub part 10 constructed as described above is formed by injection molding of a resin composition whose base resin is a crystalline resin such as LCP, PPS, or PEEK, or an amorphous resin such as PPSU, PES, or PEI. In this embodiment, by performing injection molding using the shaft member 2 as the insert component, there is formed the hub part 10 integrally equipped with the shaft member 2. Examples of the filler that can be mixed with the resin include a fibrous filler such as carbon fibers or glass fibers, a whisker-like filler such as potassium titanate, a scale-like filler such as mica, and a conductive filler such as carbon black, graphite, carbon nanomaterial, or various metal powders. Such filler can be mixed with the base resin in an appropriate amount according to the purpose such as reinforcement of the hub part 10 and imparting thereto of conductivity.

In the following, an example of the process for injection molding the hub part 10 will be described.

Figure 6:
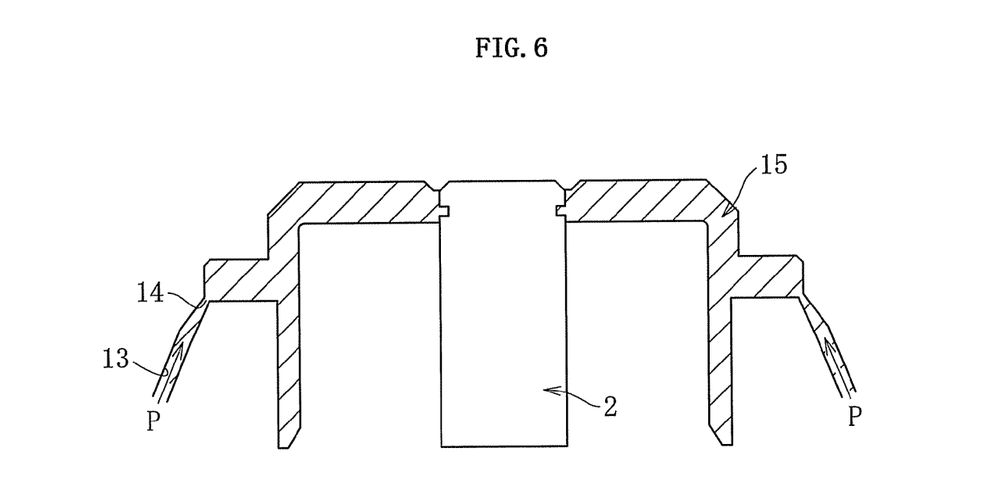
FIG. 6 A conceptual drawing illustrating a hub part injection molding process using an annular gate.

FIG. 6 conceptually illustrates the injection molding process for the hub part 10; the mold (not shown) including a stationary die and a movable die is equipped with a runner 13, an annular gate 14, and a cavity 15. In this embodiment, the annular gate 14 is a film gate, and is formed at the position of the mold corresponding to the outer peripheral edge portion of a lower end surface 10c1 of the flange part 10c (see FIG. 2). Here, the gate width of the annular gate 14 is fixed over the entire periphery. At the time of injection molding of the hub part 10, the shaft member 2 is arranged at a predetermined position in the mold (cavity 15) as an insert component.

Figure 7:
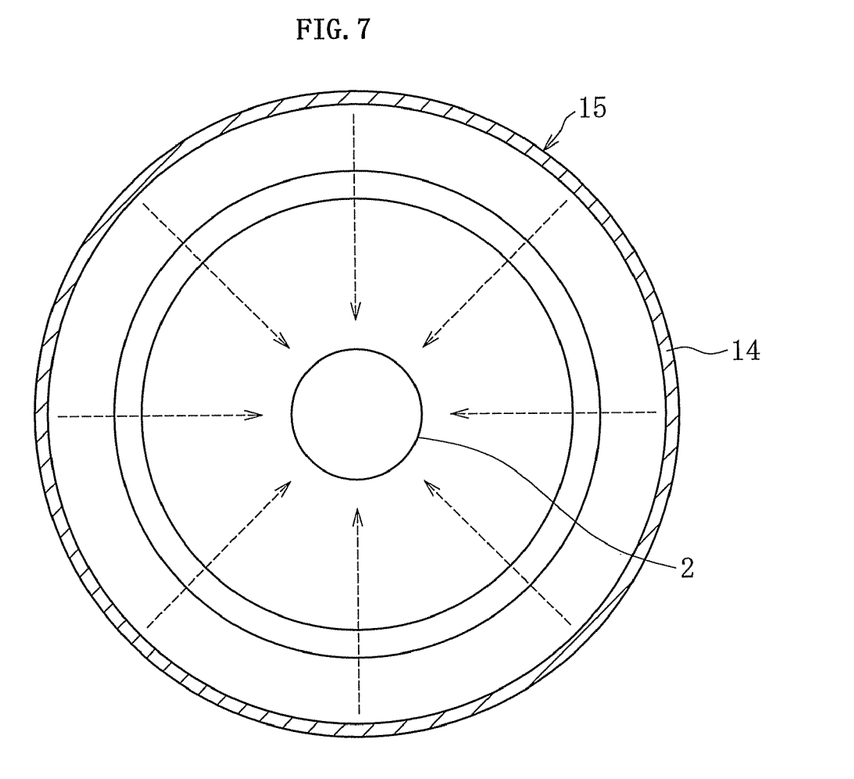
FIG. 7 A conceptual drawing illustrating how molten resin flows in a cavity when the annular gate is used.

Molten resin P injected from the nozzle of an injection molding machine (not shown) passes through the runner 13 and the annular gate 14 of the mold to fill the cavity 15. In this way, the cavity 15 is filled with the molten resin P via the annular gate 14 provided at a position corresponding to the outer peripheral end of the lower end surface 10c1 of the flange part 10c, whereby, as shown in FIG. 7, the cavity 15 is uniformly filled with the molten resin P from the entire periphery thereof. As a result, it is possible to obtain a hub part 10 which has high dimensional accuracy and exhibits a uniform radial resin orientation over the entire periphery.

Further, in this embodiment, the annular gate 14 is provided at the position of the cavity 15 corresponding to the vicinity of the disk mounting surface 10d, so, as compared, for example, with the case in which the annular gate 14 is provided at the position corresponding to the surface of the cylindrical portion 10b, it is possible to mold the flange part 10c inclusive of the disk mounting surface 10d while maintaining high injection pressure. As a result, it is possible to obtain a hub part 10 whose molding precision (such as flatness) for the disk mounting surface 10d is enhanced.

After the molten resin P filling the cavity 15 has been cured, the mold is opened, and the hub part 10 molded integrally with the shaft member 2 is extracted. As the mold is opened, a cured gate portion formed in the annular gate 14 is automatically severed (or the cured gate portion is severed by a gate cutting mechanism), and a part of the cured gate portion remains at the position on the hub part 10 corresponding to the gate as an annular gate trace 16.

Figure 8:
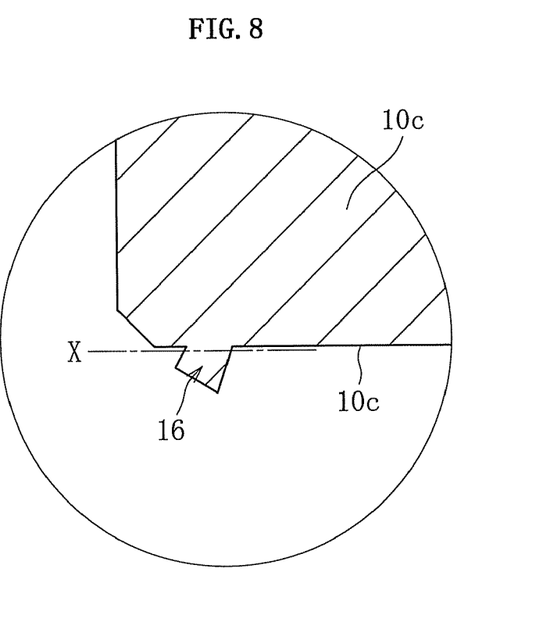
FIG. 8 An enlarged sectional view showing the portion of a hub part around a gate trace.

In this embodiment, the gate trace 16 is removed by machining or the like, for example, up to the position indicated by symbol X in FIG. 8. As a result, the major portion of the gate trace 16 is removed, and a gate removal trace as a part of the gate trace 16 remains at the outer peripheral end of the lower end surface 10c1.

The yoke 12, which is formed, for example, of a magnetic material, is bonded to the hub part 10 molded as described above, whereby the rotary member 3 is completed.

In this embodiment, the yoke 12 is an annular member of a substantially L-shaped sectional configuration, and has an inner cylindrical portion 12a and an outwardly protruding portion 12b protruding outwards from one end of the inner cylindrical portion 12a. Here, in order to adjust the axial position with respect to the stator coil 4 of the rotor magnet 5 fixed to the yoke 12, the outer portion of the outwardly protruding portion 12b is shifted downwards as compared with the inner portion thereof. Thus, as described below, the inner portion of an upper end surface 12b1 of the outwardly protruding portion 12b is in contact with the hub part 10, and the outer portion of a lower end surface 12b2 is in contact with the rotor magnet 5.

The operation of bonding the yoke 12 constructed as described above to the hub part 10 is conducted, for example, as follows.

Figure 9:
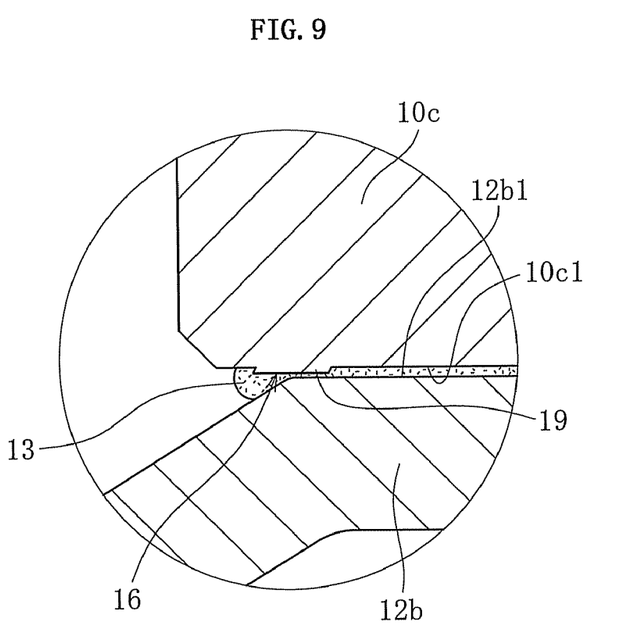
FIG. 9 An enlarged sectional view of the portion around bonding fixation surfaces of the hub part and a yoke.

Adhesive 13 is previously applied to an outer peripheral surface 10b2 of the cylindrical portion 10b and the lower end surface 10c1 of the flange part 10c, which constitute the bonding fixation surfaces with respect to the yoke 12. Then, the yoke 12 is fitted onto the outer periphery of the cylindrical portion 10b of the hub part 10, with the outwardly protruding portion 12b thereof arranged on the upper side, and the upper end surface 12b1 of the outwardly protruding portion 12b is pressed against the lower end surface 10c of the flange part 10c. As a result, the adhesive 13 previously applied to the lower end surface 10c1 is spread to the periphery from the application region, and, for example, as shown in FIG. 9, a part of the gate trace 16 (gate removal trace) is sealed by the adhesive 13 squeezed out. Thus, in this embodiment, a part of the inner portion of the gate trace 16 (gate removal trace) is sealed (stopped) by the adhesive 13 between the bonding fixation surfaces (upper end surface 12b1 and lower end surface 10c1) of the hub part 10 and the yoke 12, and the remaining portion (outer portion) thereof is sealed (stopped) by the adhesive 13 squeezed out from the bonding fixation surfaces.

In this state, heating is effected to cure the adhesive 13, whereby the operation of bonding the hub part 10 and the yoke 12 to each other is completed.

In this way, the bonding is effected with the gate trace 16 of the hub part 10 stopped by adhesive 13 applied to the lower end surface 10c1 of the hub part 10, in other words, at the time of injection molding of the hub part 10, a gate 14 of the hub part 10 is provided in the region constituting the bonding fixation surfaces of the hub part 10 and the yoke 12, or the region which is flush with the bonding fixation surfaces and where the adhesive 13 is spread over, whereby the gate trace 16 (gate removal trace) is sealed to the outside space (open air). As a result, filler or the like is prevented from being detached from the removal-machined surface of the gate trace 16 (gate removal trace) and adhering to the interior of the fluid bearing device 1 and the periphery thereof as contaminant, whereby it is possible to enhance the cleanliness of the fluid bearing device 1 and of the periphery of the motor.

Further, the operation of stopping the gate trace 16 is conducted simultaneously with the bonding of the hub part 10 and the yoke 12, so no other means than the yoke 12 and the adhesive 13 is required in stopping the gate trace 16, and there is no need to add a separate process for stopping the gate trace 16 before or after the bonding fixation process. Thus, it is possible to produce the hub part 10 (fluid bearing device 1) without involving any increase in cost.

While various lubricants may be used as the lubricant filling the interior of the fluid bearing device 1, in the case of a lubricant to be supplied to a fluid bearing device for a disk drive device such as an HDD, taking into account temperature changes during use or transportation, an ester type lubricant exhibiting low evaporation rate and low viscosity, such as dioctyl sebacate (DOS) or dioctyl azelate (DOZ), can be suitably adopted.

In the fluid bearing device 1 constructed as described above, during rotation of the shaft member 2, the formation regions for the dynamic pressure grooves 8a1 and 8a2 formed on the inner peripheral surface 8a of the sleeve portion 8 form radial bearing gaps between themselves and the outer peripheral surface 2a of the shaft member 2 opposed thereto. Further, as the shaft member 2 rotates, the lubricant in the radial bearing gaps is forced toward the axial centers of the dynamic pressure grooves 8a1 and 8a2, and undergoes an increase in pressure. In this way, due to the dynamic pressure action of the lubricant generated by the dynamic pressure grooves 8a1 and 8a2, there are formed the first radial bearing portion R1 and the second radial bearing portion R2 radially supporting the shaft member 2 in a non-contact fashion.

At the same time, the pressure of a lubricant film formed in the thrust bearing gap between the lower end surface 8b of the sleeve portion 8 (region where the dynamic pressure grooves 8b1 are formed) and the upper end surface 2b1 of the flange part 2b opposed thereto, and of a lubricant film formed in the thrust bearing gap between the dynamic pressure groove 9a1 formation region formed in the upper end surface 9a of the housing portion 9 and the lower end surface 10a1 of the hub part 10 opposed thereto, is enhanced by the dynamic pressure action of the dynamic pressure grooves 8b1 and 9a1. Then, due to the pressure of those oil films, there are formed the first thrust bearing portion T1 and the second thrust bearing portion T2 supporting the rotary member 3 (hub part 10) in the thrust direction in a non-contact fashion.

Figure 11:
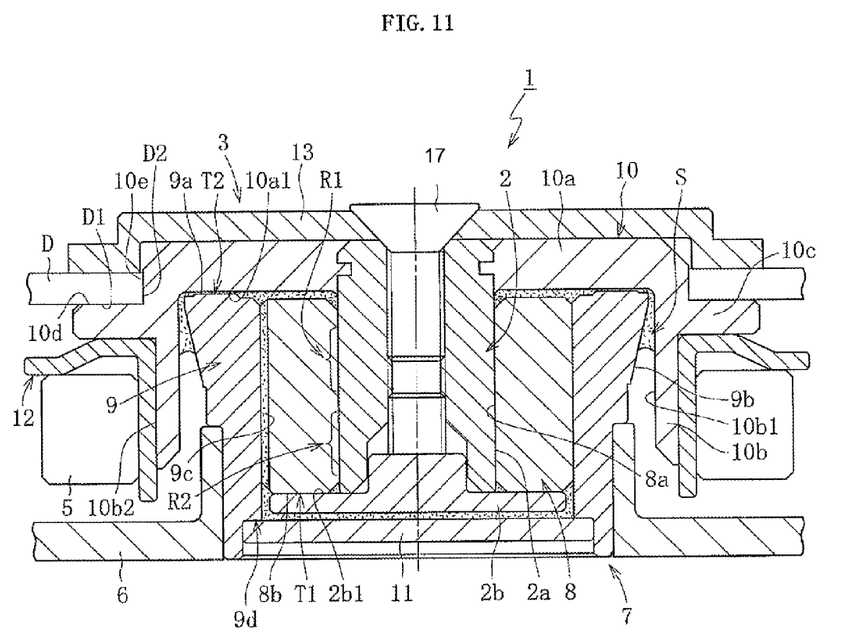
FIG. 11 A sectional view of a disk drive device using the spindle motor shown in FIG. 1 with a disk D placed thereon.

FIG. 11 shows a disk drive device (HDD) in which a disk D is mounted on the spindle motor shown in FIG. 1. By fixing the yoke 12 formed, for example, of a magnetic material, the rotor magnet 5, and the disk D to the hub part 10, subassembly of the disk drive device is completed. The following description will center on the operation of fixing the disk D to the hub part 10.

First, a cylindrical surface 10e formed in the outer periphery of the cylindrical portion 10b is fit-engaged with a hole D2 provided at the center of the disk D, and the lower end surface D1 of the disk D constituting the contact surface is brought into contact with the disk mounting surface 10d. Then, in this state, a clamper 13 shown, for example, in FIG. 11 is attached to the side of the hub part 10 opposite to the interior of the bearing, and the clamper 13 is fastened to the shaft member 2 by a screw 17, whereby the disk D is held by the clamping force applied from the clamper 13 and the hub part 10.

At the same time, the disk mounting surface 10d of the hub part 10 receives a pressurizing force from the lower end surface (contact surface) D1 of the disk D. As a result, the disk mounting surface 10d undergoes deformation in conformity with the lower end surface D1, and the disk mounting surface 10d is corrected by the lower end surface D1 of the disk D. Thus, if the dimensional accuracy of the hub part (disk mounting surface 10d) formed of resin is not so high at the time of molding, as the disk D is fixed in position, it is possible to enhance the dimensional accuracy of the disk mounting surface 10d up to a level equivalent to that of the dimensional accuracy of the lower end surface D1. Thus, it is possible to fix the disk D to the disk mounting surface 10d while maintaining high angularity, etc. with respect to the shaft member 2.

Further, as in this embodiment, by forming the region including the disk mounting surface 10d of resin, the disk mounting surface 10d can be easily deformed in conformity with the contact surface D1 of the disk D when the disk D, which is usually formed of aluminum or glass, is pressed against it.

Thus, the disk D rotates while maintaining high angularity with respect to the shaft member 2 (rotation shaft), whereby the run-out precision of the disk D during rotation is improved. Thus, the opposing distance between the disk and the disk head is maintained with high accuracy, making it possible to enhance the reading accuracy for the disk D.

In this case, the disk D rotates while maintaining high angularity with respect to the shaft member 2 (rotation shaft), whereby the run-out precision of the disk D during rotation is improved. Thus, the opposing distance between the disk and the disk head is maintained with high accuracy, making it possible to enhance the reading accuracy for the disk D.

The present invention is not restricted to the embodiment described above but allows various modifications as illustrated below.

While in the above-mentioned embodiment the gate trace 16 (gate removal trace) is formed at the outer peripheral end (beveled portion) of the lower end surface 10c1 of the flange part 10c, the gate trace 16 can be formed at an arbitrary position as long as it is formed so as to be connected to the surface of the hub part 10 in an annular fashion.

For example, in the case of the hub part 10 shown in FIG. 2, it is also possible to provide the gate trace 16 substantially over the entire area of the lower end surface 10c1 and the outer peripheral surface 10c2 of the flange part 10c, the inner and outer peripheral surfaces 10b1 and 10b2 of the cylindrical portion 10b, or the upper end surface 10a2 of the disc portion 10a (inclusive of the beveled portion at the outer peripheral end) (In other words, it is possible to provide gate 14 at the position of cavity 15 corresponding to lower end surface 10c1, outer peripheral surface 10b2, etc.).

Figure 10:
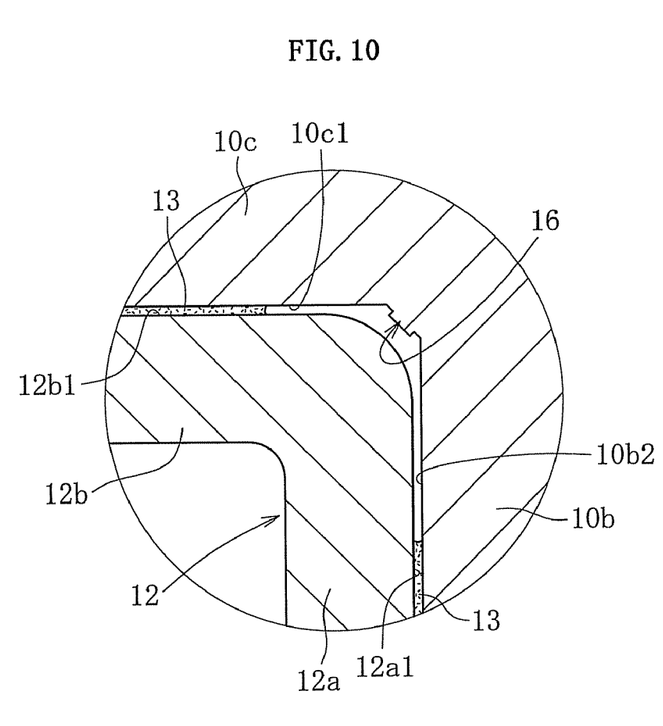
FIG. 10 An enlarged sectional view of the portion around a gate trace in another embodiment.

Alternatively, even in a case in which the gate trace 16 is not directly sealed by the adhesive 13, it is only necessary that there exist around the same a region where the hub part 10 and the yoke 12 are fixed to each other by the adhesive 13, with the gate trace 16 being indirectly sealed to the outside air (outer space) by the adhesive 13. FIG. 10 shows an example of such a construction, in which the gate trace 16 is provided near the connection between the cylindrical portion 10b and the flange part 10c of the hub part 10 and in which, on the outer side thereof, the lower end surface 10c1 of the flange part 10c and the upper end surface 12b1 of the outwardly protruding portion 12b of the yoke 12 are bonded to each other by the adhesive 13. Further, below the gate trace 16, the outer peripheral surface 10b2 of the cylindrical portion 10b and the inner peripheral surface 12a1 of the inner cylindrical portion 12a are bonded to each other by the adhesive 13.

Further, while in the above-mentioned embodiment the annular gate 14 use for injection molding of the hub part 10 is one in which the gate width is uniform in the circumferential direction, this should not be construed restrictively; it is also possible, for example, to use an annular gate 14 in which the gate width varies in the circumferential direction. In this case, the gate width of the portion, for example, where the flow distance to the nozzle of the injection machine (not shown) is maximum is made large, and the gate width of the portion where the flow distance to the nozzle is minimum is made small. In the case of the example shown in FIG. 7, by radially moving the outer peripheral surface of the cylindrical annular gate 14 shown in the drawing, the outer peripheral surface of the annular gate 14 is offset with respect to the inner peripheral surface, thereby varying the gate width in the circumferential direction.

Further, while in the above-mentioned embodiment removal machining is performed on the gate trace 16 so as to avoid contact, etc. with other members (e.g., yoke 12 and the disk), it is not necessary to perform removal machining if the gate trace 16 does not come into contact with such other members, or if it does, no particular problem is involved.

While in the above-mentioned embodiment the hub part 10 having the disk mounting surface 10d is formed of resin, as long as the disk mounting surface 10d undergoes deformation in conformity with the lower end surface (contact surface) D1 of the disk D through pressurization from the disk D, it is also possible to form the at least the region of the hub part 10 including the disk mounting surface 10d of some other material. Alternatively, it is also possible to appropriately design the configuration of the disk mounting surface 10d and the periphery thereof such that the disk mounting surface 10d can undergo deformation in conformity with the lower end surface D1.

As the means for introducing the disk D onto the disk mounting surface 10d while maintaining high angularity with respect to the shaft member 2 (rotation shaft), it is possible to adopt various means such as a means for enhancing the precision (coaxiality, cylindricality, etc. with respect to the rotation shaft) of the cylindrical surface 10e of the hub part 10 to be fit-engaged with the hole D2 of the disk D, and a means for enhancing the fixation accuracy with respect to the hub part 10 of the clamper 13 holding the disk D.

Further, while the above embodiment has been described as applied to a magnetic disk drive device such as an HDD, the present invention is also applicable to an optical disk drive device for a CD-ROM, CDR/RW, DVD-ROM/RAM or the like, and a magneto-optical disk drive device for an MD, MO or the like.

Further, while in the above-mentioned embodiment the shaft member 2 and the hub part 10 are formed integrally by resin injection molding using the metal shaft member 2 as the insert component, it is also possible, for example, to effect the integration by forming solely the hub part 10 by resin injection molding, and then forcing the end portion of the metal shaft member 2 formed separately from the hub part 10 into a hole provided at the center of the hub part 10. Alternatively, it is also possible to form the shaft member 2 of resin, and to integrally form the hub part 10 and the shaft member 2 by resin injection molding.

Further, while in the above-mentioned embodiment the thrust bearing portions T1 and T2 are provided respectively between the upper end surface 2b1 of the flange part 2b and the lower end surface 8b of the sleeve portion 8 and between the hub part 10 and the housing portion 9, the present invention is applicable no matter where the thrust bearing portions T1 and T2 may be provided. That is, it does not matter whether the lower end surface 10a1 of the hub part 10 forms a thrust bearing gap or not; for example, although not shown, both the thrust bearing portions T1 and T2 may be respectively formed between both end surfaces of the flange part 2b and the surfaces opposed to those end surfaces.

Further, also regarding the components of the fluid bearing device 1 except for the hub part 10 and the shaft member 2, the above-mentioned embodiment should not be construed restrictively. For example, although not shown, the present invention is also applicable to a case in which integration of components is achieved by, for example, integrally forming the housing portion 9 and the sleeve portion 8 of the same material (unification of bearing member 7).

Further, while in the above-mentioned embodiment the dynamic pressure action of lubricant is generated by dynamic pressure grooves of a herringbone-like or spiral configuration in the radial bearing portions R1 and R2 and the thrust bearing portions T1 and T2, this should not be construed restrictively.

For example, although not shown, it is also possible to adopt, as the radial bearing portion R1, R2, a so-called step type dynamic pressure generating portion in which axial grooves are formed at a plurality of circumferential positions, or a so-called multi-arc bearing in which a plurality arcuate surfaces are arranged in the circumferential direction and in which wedge-like radial gaps (bearing gaps) are formed between the arcuate surfaces and the cylindrical outer peripheral surface 2a of the shaft member 2 opposed thereto.

Alternatively, it is possible to form the inner peripheral surface 8a of the sleeve portion 8 as a cylindrical outer peripheral surface provided with no dynamic pressure grooves, arcuate surfaces, etc. as dynamic pressure generating portions, forming a so-called cylindrical bearing by the inner peripheral surface 8a and the cylindrical outer peripheral surface 2a of the shaft member 2 opposed thereto.

Further, although not shown as well, one or both of the first thrust bearing portion T1 and the second thrust bearing portion T2 may be formed of a so-called step bearing, an undulated bearing (one with undulated step form) or the like, in which a plurality of radial-groove-like dynamic pressure grooves are provided at predetermined circumferential intervals in the regions where the dynamic pressure generating portions are formed (e.g., lower end surface 8b of sleeve portion 8 and upper end surface 9a of housing portion 9).

Further, while in the above-mentioned embodiment the radial dynamic pressure generating portions (dynamic pressure grooves 8a1 and 8a2) are formed on the sleeve portion 8 side, and the thrust dynamic pressure generating portions (dynamic pressure grooves 8b1 and 9a1) are formed on the sleeve portion 8 and the housing portion 9 side, it is also possible to provide those dynamic pressure generating portions, for example, in the outer peripheral surface 2a of the shaft member 2 opposed thereto and the upper end surface 2b1 of the flange part 2b, or in the lower end surface 10a1 of the hub part 10.

Further, while in the above-mentioned example the fluid filling the interior of the fluid bearing device 1 and forming lubricant films in the radial bearing gaps and the thrust bearing gaps is lubricating oil, it is also possible to use some other fluid capable of forming lubricant films in the bearing gaps, for example, a gas such as air, a lubricant with fluidity such as magnetic fluid, or lubricant grease.

The invention claimed is:

1. A method of manufacturing a fluid bearing device including: a shaft member; a hub part provided integrally with or separately from the shaft member; a radial bearing portion which radially supports the shaft member so as to allow relative rotation by means of a lubricant film of a fluid generated in a radial bearing gap that an outer peripheral surface of the shaft member faces; and a yoke formed of a magnetic material and bonded to the hub part, the method comprising:
   an injection molding step of forming the hub part by injection molding of resin; and
   a bonding fixation step of bonding the yoke to the hub part formed in the injection molding step,
   wherein, in the bonding fixation step, a gate trace formed by injection molding of the hub part is sealed with an adhesive supplied to bonding fixation surfaces of the hub part and the yoke and being cured.

* * * * *